United States Patent
Buczko et al.

(10) Patent No.: US 11,346,671 B2
(45) Date of Patent: May 31, 2022

(54) METHOD AND SYSTEM FOR GLOBAL LOCALIZATION

(71) Applicant: Continental Automotive GmbH, Hannover (DE)

(72) Inventors: Martin Buczko, Munich (DE); Volker Willert, Munich (DE); Jonas Herzfeld, Munich (DE)

(73) Assignee: Continental Automotive GmbH

(*) Notice: Subject to any disclaimer, the term of this patent is extended or adjusted under 35 U.S.C. 154(b) by 0 days.

(21) Appl. No.: 16/649,098

(22) PCT Filed: Sep. 22, 2017

(86) PCT No.: PCT/EP2017/074068
§ 371 (c)(1),
(2) Date: Mar. 19, 2020

(87) PCT Pub. No.: WO2019/057296
PCT Pub. Date: Mar. 28, 2019

(65) Prior Publication Data
US 2020/0225043 A1    Jul. 16, 2020

(51) Int. Cl.
*G01C 21/30* (2006.01)

(52) U.S. Cl.
CPC .................... *G01C 21/30* (2013.01)

(58) Field of Classification Search
CPC ....................................................... G01S 17/42
See application file for complete search history.

(56) References Cited

U.S. PATENT DOCUMENTS

| | | | |
|---|---|---|---|
| 2008/0243378 A1* | 10/2008 | Zavoli | G01C 21/28 701/533 |
| 2014/0244168 A1 | 8/2014 | Isomura | |
| 2017/0010618 A1* | 1/2017 | Shashua | G05D 1/0221 |
| 2018/0045519 A1* | 2/2018 | Ghadiok | G06K 9/2054 |
| 2018/0276989 A1* | 9/2018 | Braeuchle | G08G 1/09623 |
| 2019/0101398 A1* | 4/2019 | Mielenz | G06T 7/73 |

FOREIGN PATENT DOCUMENTS

| | | |
|---|---|---|
| EP | 2224208 A2 | 9/2010 |

OTHER PUBLICATIONS

International Search Report and Written Opinion dated Jun. 7, 2018 from corresponding International Patent Application No. PCT/EP2017/074068.

Brubaker Marcus A. et al. "Map-Based Probabilistic Visual Self-Localization, IEEE Transactions on Pattern Analysis and Machine Intelligence", IEEE Computer Society, USA, vol. 38, No. 4, Apr. 1, 2016, pp. 652-655, ISSN: 0162-8828, DOI: 10.1109/TPAMI.2015.245.3975, [retrieved on Mar. 3, 2016].

* cited by examiner

*Primary Examiner* — Abby Y Lin
*Assistant Examiner* — Danielle Marie Jackson

(57) ABSTRACT

The present disclosure relates to method and system for global localization using a combination of visual odometry and optimization approaches in order to map a vehicle trajectory to an offline map with a-priori knowledge of at least two observed streets in order to reduce the optimization parameter space from three dimensions to one dimensions compared to standard iterative closest point methods.

15 Claims, 4 Drawing Sheets

METHOD AND SYSTEM FOR GLOBAL LOCALIZATION

The present disclosure relates to a method and system for global localization of a vehicle. The present disclosure specifically relates to a method and system for global localization of a vehicle using a sensor trajectory obtained from a generic sensor matched to a map.

Precise knowledge on the ego-position of a vehicle is an essential requirement for autonomous driving. Numerous methods have been developed such as using DVB-T emitters with known position or using at least three base stations of a cellular communication network for triangulation. Moreover, methods applying camera based localization have been disclosed. Features in camera images along the track may be marked to create a visual map. When driving, matching current images to these features is used to get an estimate of the current vehicle position. This may be fused with GPS (global positioning system) data and vehicle sensors for maximum availability and precision of localization. Landmark based localization may be combined with visual odometry. Visual odometry provides locally precise and high frequent relative motion updates. However, as this approach relies on specialized offline maps, a serious effort is required. Moreover, some features may not be static and therefore unusable. Furthermore, a local trajectory obtained from visual odometry may be mapped to a map without any additional knowledge using optimization approaches, e.g. iterative closest point methods may be applied. However, these do not work well in Manhattan-like topologies due to the ambiguities of the streets on the map. Last but not least, these approaches are computationally expensive and may not have a unique solution.

BRIEF SUMMARY

It is therefore an objective of the present disclosure to address the issues stated above and to provide a method and a system for global localization.

This objective is achieved by a method according to the independent method claim and a system according to the independent system claim. Dependent claims relate to further aspects of the present disclosure.

The present disclosure relates to a method for global localization. The method is based on matching a trajectory of a vehicle to a map in order to determine the global geographical position of a vehicle. The method includes acquiring a trajectory of a vehicle and concurrently searching for street signs. The trajectory may be acquired by applying odometry. The searching for street signs may include attempting to detect the shape of a street sign and the street name on the street sign. The method includes, upon detection of a first street sign, saving the detection time and a first point on the trajectory related to a first street corresponding to the first street sign; and further includes, upon detection of a second street sign, saving the detection time and a second point on the trajectory related to second street corresponding to the second street sign. The two points on the trajectory with corresponding street names can be used to pre-select a patch on a map to which the trajectory shall be matched.

The first point and the second point do not necessarily have to be on the trajectory. The first point and the second point can be relative to the trajectory. As long as a street and a corresponding street can be observed and identified by the vehicle, they can be used for localizing the vehicle as will be explained later in more detail. Throughout the description the term "on the trajectory" may be used interchangeably to the term "on or relative to the trajectory".

The method continues by determining a reference distance between the first point on the trajectory related to the first street and the second point on the trajectory related to the second street; and determining on a map at least one reference location on the first street corresponding to the first street sign having the reference distance from the second street corresponding to the second street sign. The reference distance serves to find an arbitrary location on the first street on the map that is the reference distance away from another location on the second street on the map. The trajectory may then be mapped to said arbitrary point on the first street.

Therefore, the method further includes mapping the trajectory to the map such that the first point on the trajectory related to the first street coincides with the at least one reference location on the map. The first point on the trajectory mapped to the at least one reference location can be regarded as the origin of a local coordinate system of the trajectory. This origin servers as a center of rotation when rotating the trajectory.

The method further includes optimizing the position of the trajectory on the map according to an optimization criterion by shifting the first point on the trajectory along the first street on the map and concurrently rotating the trajectory on the map under the constraint that the second point on the trajectory corresponding to the second street coincides with another location of the second street on the map or another location having a minimum distance from the second street on the map, the other location having the reference distance from a location on the first street on the map coinciding with the first point on the trajectory.

Accordingly, the trajectory is only shifted along the first street and rotated concurrently in order to fulfil the reference distance constraint. Specifically, optimizing the position of the trajectory may include optimizing a location on the first street by shifting the first point on the trajectory between the beginning and the end of the first street on the map and concurrently rotating the trajectory such that the reference location is a center of rotation.

In contrast to iterative closest point mapping methods, in which the x,y coordinate of the origin of the trajectory and the angle of the trajectory is optimized to best match the trajectory to the map, with the method described above, only one optimization parameter remains, that is the location on the first street that coincides with the first point of the trajectory. The location on the first street may be parameterized, with the optimization parameter running between the beginning of the street and the end of the street. For example, the optimization parameter may be normalized to run between zero and one, zero corresponding to the beginning of the first street and one corresponding to the end of the first street. The rotation angle does not need to be optimized explicitly. The rotation angle arises as a result of the shifting under the constraint of the reference distance, i.e. a rotation angle in which the location on the first street on the map coinciding with the first point on the trajectory is the reference distance away from another location on the second street coinciding with the second point on the trajectory. The first point on the trajectory may the reference distance away from another location having a minimum distance to the second street, the other location coinciding with the second point on the trajectory.

Accordingly, the method transforms an optimization problem having three optimization parameters into an optimization problem having only one parameter. Depending on the optimizing criterion, generally, a cost functional having a parameter space of three optimization parameters has more local maxima and minima than a cost functional having only one optimization parameter. Thus, the method described above transforms a three dimensional mapping into a one dimensional mapping problem by integrating a street sign detected at a certain time into the cost functional of the three dimensional mapping problem. The one dimensional mapping problem is less ill-posed than the corresponding three dimensional mapping problem. A correct mapping can thus be achieved more reliably and less computationally expensive.

One aspect of the method relates to the optimization criterion. The optimization criteria may be a deviation between the trajectory and a plurality of streets on the map such as a mean squared error. Alternatively, optimizing the position of the trajectory on the map may include applying an iterative closest point method with respect to the trajectory and a plurality of nearest streets on the map.

The cost functional, i.e. the optimization criterion, as a function of the parameter space, even though reduced to only optimization parameter, may still be multimodal. In order to address this issue, the interval of the optimization parameter between the beginning of the first street and the end of the first street may be sub-divided into a plurality of intervals. For each interval of the plurality of intervals, the method may include optimizing the location on the first street by shifting the first point on the trajectory between the beginning and the end of said interval and concurrently rotating the trajectory such the reference location is a center of rotation. The final value of the cost functional of an interval can be compared to the final values of the cost functional of the other intervals of the plurality of intervals in order to find the interval and its corresponding trajectory that best fulfils the optimization criteria. The method may, hence, include choosing the position of the trajectory corresponding to the interval of the plurality of interval that best fulfils the optimization criteria. This way, the multimodal optimization problem may be transformed into a plurality of monomodal optimization problems. Thus the global minimum of the cost functional may be found even by a local optimization method that could get stuck in a local minimum of the cost functional if applied to the entire parameter space of the optimization parameter, i.e. the entire first street.

One aspect of the method relates to determining at least one other reference location. Determining the reference location in the first place may not be unique, i.e. there may be two reference locations. If the optimization does not yield a sufficiently good final optimization result, the optimization may be repeated for another reference location. The method may further include determining on a map at least one other reference location on the first street corresponding to the first street sign having the reference distance from the second street corresponding to the second street sign; mapping the trajectory to the map such that the first point on the trajectory related to the first street coincides with the at least one other reference location on the map; optimizing the position of the trajectory on the map according to an optimization criterion by shifting the first point on the trajectory along the first street on the map and concurrently rotating the trajectory on the map under the constraint that the second point on the trajectory corresponding to the second street coincides with another location of the second street on the map having the reference distance from a location on the first street on the map coinciding with the first point on the trajectory.

One aspect of the method relates to choosing an initial map patch. The initial map patch in which the first and second street are searched for may be chosen based on a GPS position of the vehicle. The method may therefore include choosing a map patch based on a GPS position of the vehicle; and constraining to the map patch the determining on a map at least one reference location on the first street corresponding to the first street sign having the reference distance from the second street corresponding to the second street sign.

If street signs cannot be detected along a substantial portion of the trajectory, the method may be fall back to standard iterative closest point, i.e. to optimizing three parameters. However, the end of the last sub-trajectory matched with the method described above may be taken as an initial starting point of a current sub-trajectory to be matched merely by applying iterative closest point with three dimensions. Accordingly, the method may include dividing the trajectory into a plurality of sub-trajectories comprising a first sub-trajectory having at least two detected street signs and a second sub-trajectory having less than two detected street signs; applying an iterative closed point method for optimizing the vertical position, the horizontal position and the angle of the second sub-trajectory by taking the end of the first sub-trajectory as an initial starting point after it has been mapped to the map.

One aspect of the present disclosure relates to a system. The system may have means for acquiring a trajectory of a vehicle and means for concurrently searching for street signs. The system may have a memory configured to, upon detection of a first street sign, save the detection time and a first point on the trajectory related to a first street corresponding to the first street sign; and may further be configured to, upon detection of a second street sign, save the detection time and a second point on the trajectory related to second street corresponding to the second street sign. The system may even further have one or more processors configured to determine a reference distance between the first point on the trajectory related to the first street and the second point on the trajectory related to the second street; determine on a map at least one reference location on the first street corresponding to the first street sign having the reference distance from the second street corresponding to the second street sign; map the trajectory to the map such that the first point on the trajectory related to the first street coincides with the at least one reference location on the map; optimize the position of the trajectory on the map according to an optimization criteria by shifting the first point on the trajectory along the first street on the map and concurrently rotating the trajectory on the map under the constraint that the second point on the trajectory corresponding to the second street coincides with another location of the second street on the map or another location having a minimum distance from the second street on the map, the other location having the reference distance from a location on the first street on the map coinciding with the first point on the trajectory.

The means for acquiring the trajectory of a vehicle and the means for concurrently searching for street signs may include means for odometry, e.g. a stereo camera. The one or more processors may be included in a computing device coupled to the means for odometry and the memory and wherein the computing device may be included in a backend device or in a mobile device or directly in the vehicle.

The coupling may wireline or in case of the backend device or the mobile device wireless.

The present disclosure further relates to computer product comprising instructions which, when the program is executed by computer, cause the computer to carry out a method of global localization by receiving a trajectory of a vehicle, the trajectory comprising a first point that corresponds to a first street detected street sign, the first point being associated with a detection time and the street name of the first street, the trajectory further comprising a second point that corresponds to second detected street sign; the second point being associated with a detection time and the street of the second street; determining a reference distance between the first point on the trajectory related to the first street and the second point on the trajectory related to the second street; determining on a map at least one reference location on the first street corresponding to the first street sign having the reference distance from the second street corresponding to the second street sign; mapping the trajectory to the map such that the first point on the trajectory related to the first street coincides with the at least on reference location on the map; optimizing the position of the trajectory on the map according to an optimization criteria by shifting the first point on the trajectory along the first street on the map and concurrently rotating the trajectory on the map under the constraint that the second point on the trajectory corresponding to the second street coincides with another location of the second street on the map or another location having a minimum distance from the second street on the map, the other location having the reference distance from a location on the first street on the map coinciding with the first point on the trajectory.

As above, the ego-position of a vehicle may be recovered using a stereo camera as only sensor and offline map data for global registration. Hence, recovering the ego-position does neither require global sensors such as GPS nor a rough initial estimate.

BRIEF DESCRIPTION OF THE FIGURES

Different implementations of the present invention are shown in the drawings and will be described and discussed below. Therein.

DETAILED DESCRIPTION

Visual odometry describes the reconstruction of rotation $R_V$ and translation $T_V$ of a camera system attached to a mobile platform using visual data. Based on the difference between the optical flow from all features $f_n^{t-1}$ indexed by n at time t−1 to subsequent image's corresponding features $f_n^t$ and the modeled flows according to the motion hypothesis as:

$$(\hat{R}_V^t, \hat{T}_V^t) = \operatorname{argmin}_{R_V, T_V} \Sigma_{n=1}^N \|x_n^{t-1} - \pi(R_V Z_n^t \hat{x}_n^t + T_V)\|_n^2 \quad (1)$$

$\{X_n^{t-1}, X_n^t\} \in \mathbb{R}^3$ denotes the corresponding pair of Euclidian coordinates for the feature "n" at time "t" $x_n^t = [x_n^t, x_n^t]^T$ and 3D coordinate $X_n^t = [X_n^t, Y_n^t, Z_n^t]^T$. The respective image of coordinates with focal length f and principle point $o = [o_x, o_y]^T$ at time t can be written as $$\hat{x}_n^t = [\hat{x}_n^t, \hat{y}_n^t, 1]^T = \left[\frac{x_n^t - o_x}{f}, \frac{y_n^t - o_y}{f}, 1\right]^T.$$

The planar projection π maps 3D points to pixel coordinates as $$[X, Y, Z]^T \rightarrow \left[\frac{fX}{Z} + o_x, \frac{fY}{Z} + o_x\right]^T \cdot \hat{R}_V^t, \hat{T}_V^t$$

thus describe the process of acquiring the trajectory of a vehicle. The acquired trajectory then needs to be matched to an off-line map, e.g. by using an optimization based approach.

Iterative closest point methods may be applied for optimizing the trajectory to the off-line map by translating and rotating the trajectory. However, in Manhattan-like topologies, iterative closest point method tend fail due to ambiguities in of street's arrangement. This is due to the fact that the respective cost function is multimodal.

Figure 1:
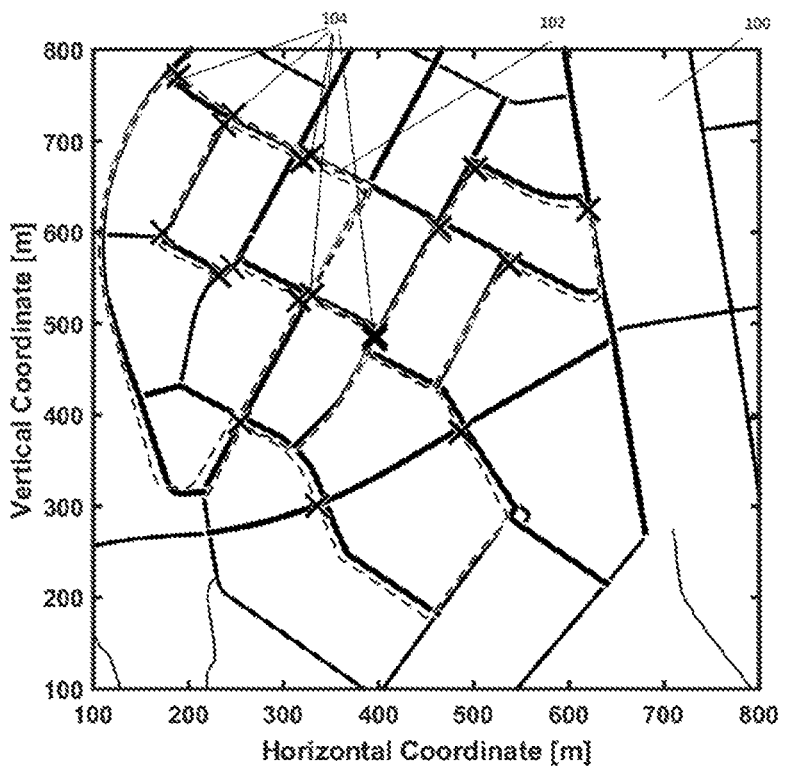
FIG. 1 shows a recorded trajectory obtained by visual odometry on a map.

In order to address this problem, according to the method information on recognized street signs may be integrated into this problem. Accordingly, the method comprises, apart from acquiring a trajectory of the vehicle, the concurrently searching for street signs. FIG. 1 shows a map 100 with a trajectory 102, which is reconstructed by visual odometry. The crosses 104 mark the observations of well visible street signs at a certain point of the trajectory. An observed street sign may be associated with a street that is part of the trajectory or with a street that is merely related to the trajectory, i.e. having a defined relation to the trajectory while not being part of it. The observed street signs can be used to globally register the local, relative trajectory on the map, i.e. to provide an initial position of the trajectory on the map. Hence, the initial position can be determined by fusing the trajectory from odometry, offline map data and the information on recognized signs. The offline map Ω may consist of J streets, $\Omega = [\omega_1, \ldots, \omega_J]$, where each street $\omega_J$ may consist of $P_J$ nodes, $\omega_j^p = [\omega_{j,x}^P, \omega_{j,x}^P]^T$. $\omega_{A,c_A}/\omega_{B,c_B}$ denotes a list of streets with the names of the first/second observed street time at detection time $t_A/t_B$ and $\tau_A/\tau_B$ as the respective location on the vehicle observed trajectory. A combination of places on the streets $\omega_{A,c_A}(\lambda_A)$ and $\omega_{B,c_B}(\lambda_B)$, wherein $\lambda_{A/B}$, $0 \leq \lambda_{A/B} \leq 1$ uniquely parameterizes the position of the trajectory on the street, may be investigated for finding an initial mapping position. This may be performed by iterating over the candidate indices $c_a$ for the first and $c_b$ for the second street observed street, until the following condition is fulfilled:

$$\exists (\lambda_A, \lambda_B) := \|\omega_{A,c_A}(\lambda_A) - \omega_{B,c_B}(\lambda_B)\|_2 = \|\tau_A - \tau_B\|_2 \quad (2)$$

Figure 2:
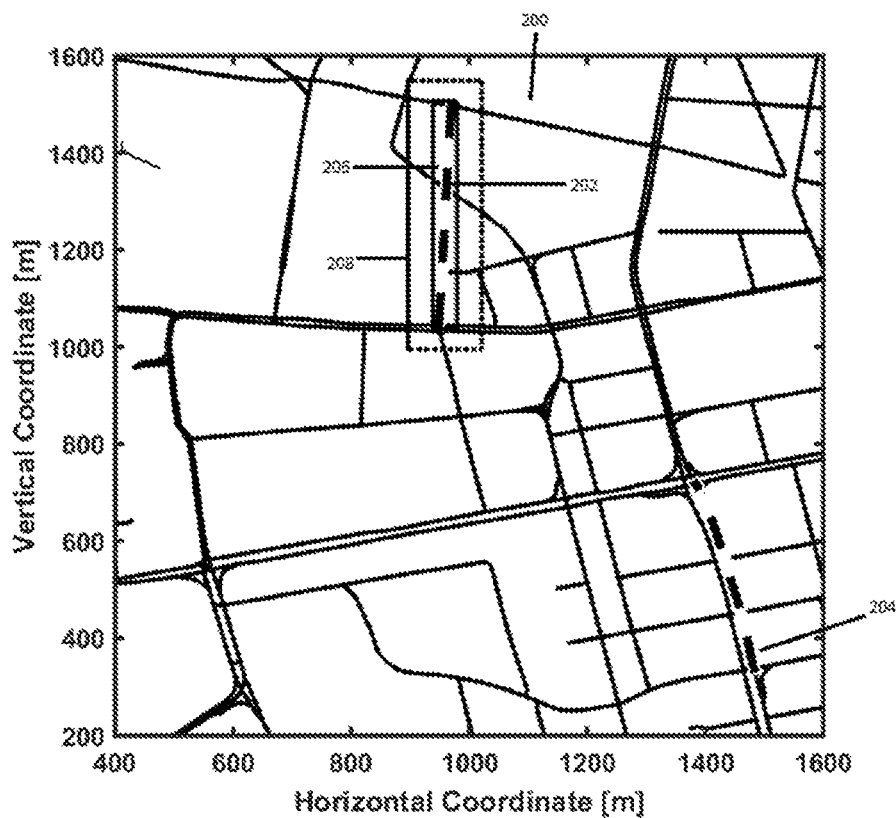
FIG. 2a and FIG. 2b each show a map with two observed streets for initial mapping.
Figure 2:
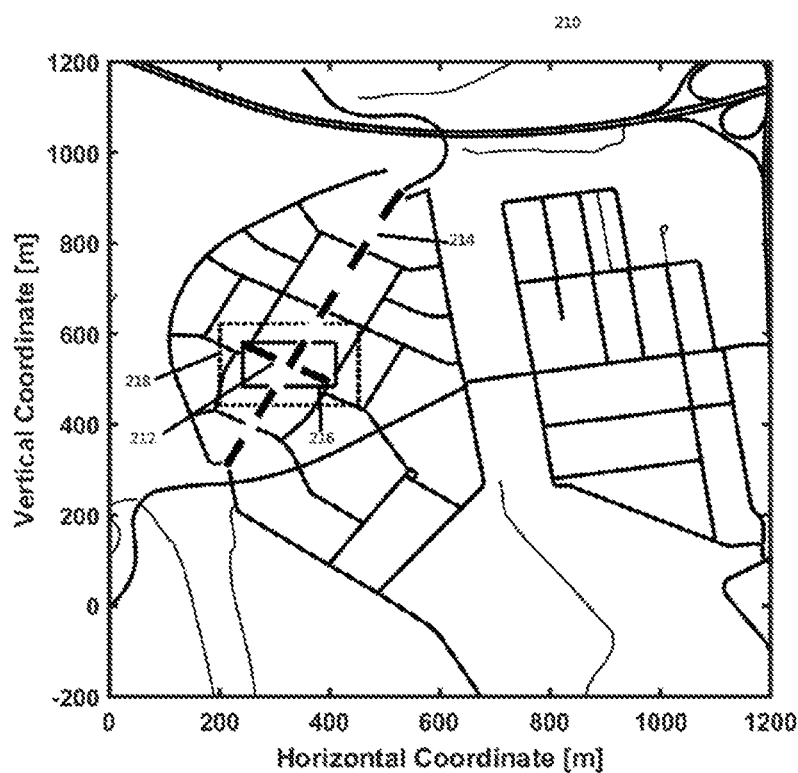

(2) may be approximated representing the first trajectory by a bounding box. This bounding box may extended by $\|\tau_A - \tau_B\|_2$ in ±x and ±y direction. If an element of the second street is in this box, Eq. 2 is fulfilled, as will be explained with reference to FIG. 2 which shows an example for initialization with camera and map information only. FIG. 2a shows an extract from a map 200 of a city. First street 202 corresponding to a first street sign and second street 204 corresponding to a second street sign are each indicated by a dotted line. By evaluating the trajectory from visual odometry, the distance between the relative positions at the detection times of the first and second streets can be determined. Extending the solid lined bounding box 206 with this reference distance, another, dotted lined, bounding box 208 is created. At least one element of the second street must be inside bounding box 208, if the map topology fits to the measured trajectory. As can be observed, this is not the case. Hence, map 200 is not a possible map patch. FIG. 2b shows a map 210 of another city. First street 212 corresponding to a first street sign and second street 214 corresponding to a second street sign are each indicated by a dotted line. The second street 214 is, in contrast to map 200 as shown in FIG. 2a, contained in the dotted lined bounding box 218. Hence, map 210 is a possible map patch. This evaluation may be carried out for all possible candidates. If only one map patch remains, an initialization is found. If not, further street signs may be evaluated in the same way, to obtain a unique initialization. Alternatively the candidates may be further processed to find a unique solution, where the average iterative closes point error lays below a threshold.

The method is based on parameter space reduction as will be explained by comparing it to standard iterative closest point methods. As the offline map may be generated from Open Street Map (OSM) data, only plane matching needs be performed. With this, the rotation matrix R with rotation a around the axis $[0,0]^T$ and normal to the map plane emerges as $$R = \begin{bmatrix} \cos(\alpha) & -\sin(\alpha) \\ \sin(\alpha) & \cos(\alpha) \end{bmatrix}. \quad (3)$$

Shifting the trajectory within the map may performed with the addition of $T=[t_x, t_y]^T$. Hence, rotating and shifting the trajectory $\tau$ results in in three parameters $\{t_x, t_y, \alpha\}$ that have to be estimated. The resulting optimization problem may be formulated as:

$$(\hat{\alpha}, \hat{t}_x, \hat{t}_y) = \underset{R,T}{\operatorname{argmin}} \sum_{t=0}^{t_{max}} d_t(R, T)^2 \quad (4)$$

with $d_t(R, T) = \min_{j,p} \|R\tau_t + T - \omega_j^p\|_2 \quad (5)$

However, by combining the reconstruction of a trajectory of a vehicle in a visual odometry pipeline with simultaneously detecting street signs allows to reduce the optimization parameter space dimension from $\mathbb{R}^3$ to $\mathbb{R}^1$. Jointly, the constraint arises from a street sign being observed at a certain time which is integrated into the cost function.

The optimization parameter $0 \leq \lambda \leq 1$, with $\lambda \in \mathbb{R}$ is introduced. It describes an arbitrary location on the first street coinciding with the first point on the trajectory, where $\lambda=0$ stands for the beginning of the street and $\lambda=1$ stands for the end of the first street. This location may be used to shift the trajectory such that the trajectory at time $t_A$ at which the first street was observed lays at the origin of its coordinate system, and thereby is a center of rotation:

$$T(\lambda) = \omega_A(\lambda) - \tau_A. \quad (6)$$

Streets may be stored as collections of ordered nodes. Connecting these ordered nodes with straight lines from one $\omega_j^p$ to the next node $\omega_j^{p+1}$ recovers the shape of the street. This leads to a sparse representation of the information but needs to be considered. For a given parameter $\lambda$, the corresponding continuous coordinate on street j, $\omega_j(\lambda)$ may be calculated as the interpolation between node number $p_0$ and $p_0+1$ as $$\omega_j(\lambda) = \omega_j^{p_0} + \frac{\lambda L(\omega_j^{P_j}) - L(\omega_j^{p_0})}{L(\omega_j^{p_0+1}) - L(\omega_j^{p_0})} (\omega_j^{p_0+1} - \omega_j^{p_0}) \quad (7)$$

Index $p_0$ is determined with the accumulated street length $L(\omega_j^{P_k}) = \sum_{p=2}^{P_k} \|\omega_j^{p-1} - \omega_j^p\|_2$ and the total length $L(\omega_j^{P_j})$ of street j, as follows:

$p_0$ is the highest index to fulfil $$\frac{L(\omega_j^P)}{L(\omega_j^{P_j})} \leq \lambda.$$

Therewith, it is ensured that point of the trajectory at observation time $t_A$ of the first street can shifted continuously and always lays on the first street within the map.

Now, (6) and (7) can be used to substitute the shift $[t_x, t_y]^T$ by $T(\lambda)$, leading to an optimization parameter reduction of one. The rotation angle $\alpha$ can be derived as follows:

Since the observation times of the first street $t_A$ and $t_B$ are known, also the metric distance, i.e. a reference distance, between those points in the map $d(\omega_A(\lambda), \omega_B(\lambda))$ can be calculated as $$d(\omega_A(\lambda), \omega_B(\lambda)) = \|\tau_A - \tau_B\|_2. \quad (8)$$

Next, the crossing point between a circle with radius $r = (\omega_A(\lambda), \omega_B(\lambda))$ around $\lambda$-determined point on the first street $\omega_A(\lambda)$ and the second observed street can be calculated as:

$$\omega_B(\lambda_B) = \{x \in \mathbb{R} : \|x - \omega_A(\lambda)\|_2\} \cap \omega_B. \quad (9)$$

Due to the sparse representation of the map data, $\omega_B(\lambda_B)$ has to be found by iterating through all lines, formed by $\omega_B^p$ to $\omega_B^{p+1}$ until the crossing point is found. If no unique solution can be identified, both resulting solutions may be used an evaluated in parallel. The configuration with the lower error according to (4) may then be selected.

With the determined crossing point $\omega_B(\lambda_B)$ and vertical and horizontal street components $\omega_{A,x}(\lambda)$ and $\omega_{A,y}(\lambda)$, the rotation angle $\alpha$ can be determined in dependency of $\lambda$ as follows:

$$\alpha = \arctan\left(\frac{\omega_{B,y}(\lambda_B) - \omega_{A,y}(\lambda)}{\omega_{B,x}(\lambda_B) - \omega_{A,y}(\lambda)}\right) - \arctan\left(\frac{\tau_{B,y} - \tau_{A,y}}{\tau_{B,x} - \tau_{A,x}}\right) \quad (10)$$

Figure 3:
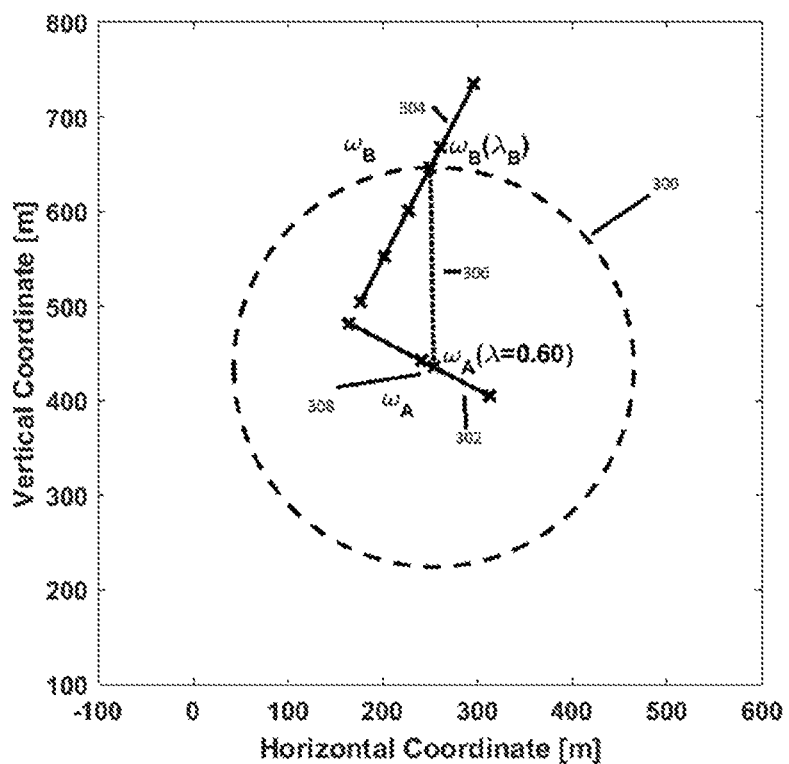
FIG. 3 shows a circle of rotation.

The principle of the rotation substation is depicted in FIG. 3.

Line 302 formed by three crosses from the map data is the first observed street $\omega_A$. Line 304 formed by five crosses from the map data is the second observed street $\omega_B$. With $\lambda=0.6$ the position $\omega_A(\lambda)$ off cross 308 is determined, applying (7). Circle 300 with the radius can be calculated by applying (8). The intersection point with the second observed street $\omega_B$ visualized with cross 310 can be determined applying (9). Line 306 connected cross 308 and cross 310 can then be used to calculate the map based rotation angel, corresponding to the first of (10) by applying (10).

Referring back to FIG. 2 and as above, the method may include determining a reference distance between the first point on the trajectory related to the first street 212 and the second point on the trajectory related to the second street 214; and determining on a map at least one reference location on the first street 212 corresponding to the first street sign having the reference distance from the second street 214 corresponding to the second street sign. The reference distance serves to find a reference location on the first street 212 on the map that is the reference distance away from another location on the second street 214 on the map.

The method may further includes mapping the trajectory to the map such that the first point on or relative to the trajectory related to the first street 212 coincides with the at least one reference location on the map. From this initial mapping the trajectory can then be further aligned with the map.

Moreover, the method may include optimizing the position of the trajectory on the map according to an optimization criterion by shifting the first point on or relative to the trajectory between the beginning and the end of the first street and concurrently rotating the trajectory on the map under the constraint that the second point on or relative to the trajectory corresponding to the second street coincides with another location of the second street on the map having the reference distance from a location on the first street on the map coinciding with the first point on or relative to the trajectory, i.e. such that the reference location is a center of rotation, see FIG. 3.

Figure 4:
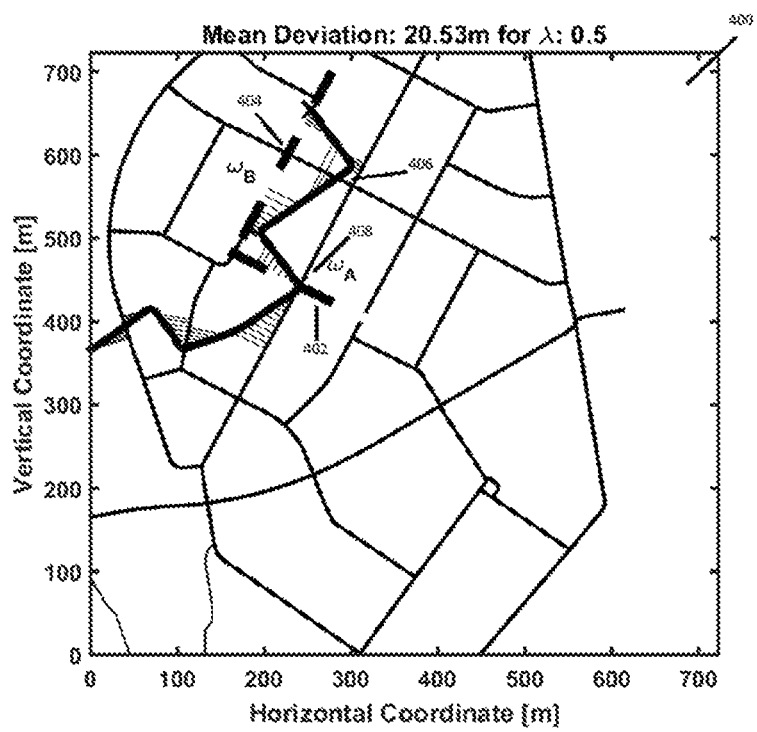
FIG. 4a, 4b, 4c show an initial, an intermediate and a final state of the optimization process respectively.
Figure 4:
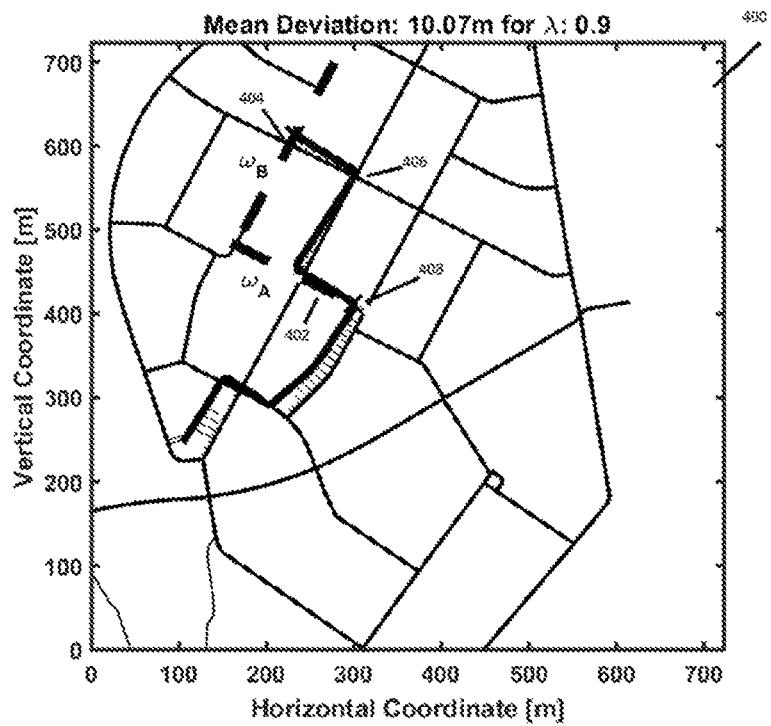
Figure 4:
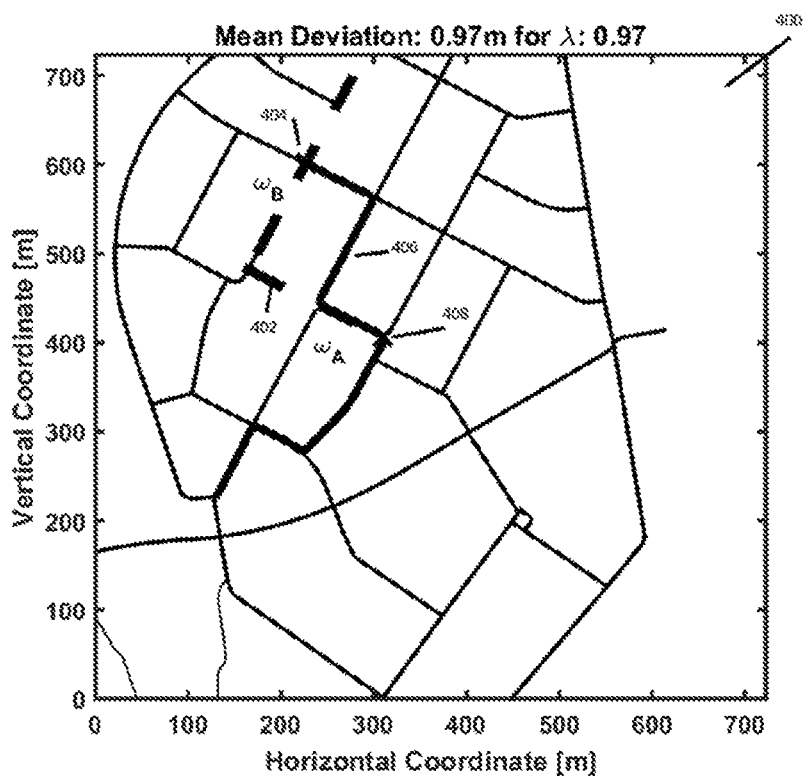

FIG. 4a-FIG. 4c show an example for the optimization process, wherein FIG. 4a shows the initial state, FIG. 4b and intermediate state and FIG. 4c the final state.

FIG. 4a shows the initial state of the optimization process after mapping trajectory 406 to map 400 at reference location 408 in which the reference difference, i.e. the distance between a first point $\tau_A$ on trajectory 406 related to first street $\omega_A$ represented by line 402 corresponding to a first detected street sign observed at detection time $t_A$ and a second point $\tau_B$ on trajectory 406 related to second street $\omega_B$ represented by line 404 corresponding to a second detected street sign observed at detection time $t_B$, is equal to the difference between reference location 408 at first street $\omega_A$ and a corresponding location at street $\omega_B$. After the initial mapping, trajectory 406 is shifted along first street $\omega_A$ and rotated in order minimize the deviation between trajectory 406 and nearest streets, indicated by the thin parallel lines perpendicular to the street to which the deviation refers. FIG. 4b shows an intermediate state of the optimization process in which it can be observed that the deviation has become smaller compared to the initial state. FIG. 4c shows the final state of the optimization process in which it can be observed that trajectory 406 has a near perfect match to its closest streets. Specifically, the trajectory 406 maps exactly to a plurality of streets.

Figure 5:
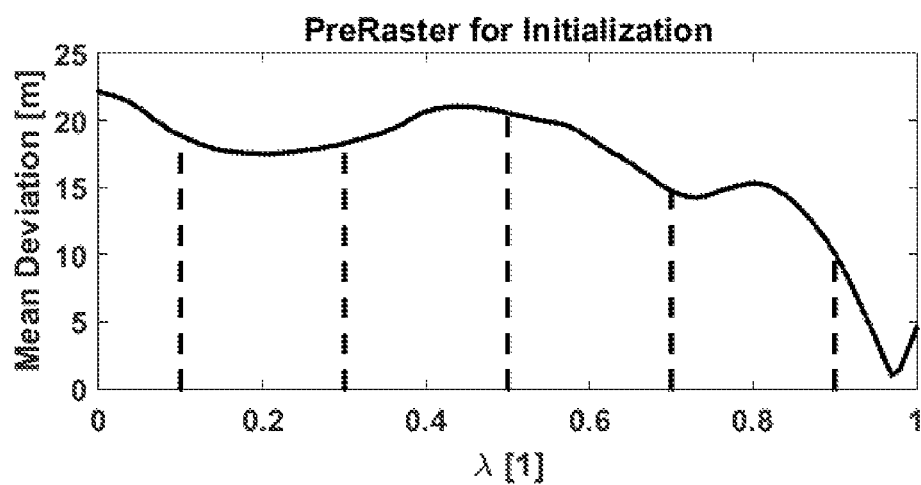
FIG. 5 shows a graph showing the cost function versus the optimization parameter.

FIG. 5 shows the value of the cost function, i.e. the mean deviation versus the optimization parameter $\lambda$. It can be observed that the cost function has a global minimum at $\lambda=0.97$ corresponding to the final state as shown in FIG. 4c, but also several local minima. Hence, a gradient based optimizer might get stuck in a local miminum. Therefore the parameter space of $\lambda$ is rastered, i.e. divided into a plurality of intervals indicated by the dashed line. The optimization is performed for each of the plurality of intervals. Within each interval the cost function can be regarded as unimodal. Therefore, in each of the plurality of intervals a unique minimum exists. The interval having the smallest deviation is taken as the final solution.

The invention claimed is:

1. A method for global localization, the method comprising:
   acquiring a trajectory of a vehicle and concurrently searching for street signs;
   upon detection of a first street sign, saving the detection time and a first point on the trajectory related to a first street corresponding to the first street sign;
   upon detection of a second street sign, saving the detection time and a second point on the trajectory related to a second street corresponding to the second street sign;
   determining a reference distance between the first point on the trajectory related to the first street and the second point on the trajectory related to the second street;
   determining on a map at least one reference location on the first street corresponding to the first street sign having the reference distance from the second street corresponding to the second street sign;
   mapping the trajectory to the map such that the first point on the trajectory related to the first street coincides with the at least one reference location on the map;
   optimizing the position of the trajectory on the map according to an optimization criterion by shifting the first point on the trajectory along the first street on the map and concurrently rotating the trajectory on the map under the constraint that the second point on the trajectory corresponding to the second street coincides with another location of the second street on the map or another location on the map, the other location on the map having the reference distance from a location on the first street on the map coinciding with the first point on the trajectory.

2. The method of claim 1, wherein the optimization criterion is a deviation between the trajectory and a plurality of streets on the map and wherein optimizing the position of the trajectory on the map comprises minimizing the deviation with respect to a location on the first street coinciding with the first point on the trajectory.

3. The method of claim 1, wherein optimizing the position of the trajectory on the map comprises applying an iterative closest point method with respect to the trajectory and a plurality of nearest streets on the map.

4. The method of claim 1, wherein optimizing the position of the trajectory comprises optimizing a location on the first street by shifting the first point on the trajectory between the beginning and the end of the first street on the map and concurrently rotating the trajectory such that the reference location is a center of rotation.

5. The method of claim 4, wherein optimizing the position of the trajectory comprises dividing the first street between its beginning and between its end into a plurality of intervals; and
   for each interval of the plurality of intervals, optimizing the location on the first street by shifting the first point the trajectory between the beginning and the end of said interval and concurrently rotating the trajectory such that the reference location is a center of rotation.

6. The method of claim 5 further comprising:
   choosing the position of the trajectory corresponding to the interval of the plurality of intervals that best fulfils the optimization criterion.

7. The method of claim 1 further comprising:
   determining on a map at least one other reference location on the first street corresponding to the first street sign having the reference distance from the second street corresponding to the second street sign;
   mapping the trajectory to the map such that the first point on the trajectory related to the first street coincides with the at least one other reference location on the map;
   optimizing the position of the trajectory on the map according to an optimization criteria by shifting the first point on the trajectory along the first street on the map and concurrently rotating the trajectory on the map under the constraint that the second point on the trajectory corresponding to the second street coincides with another location of the second street on the map or another location on the map, the other location on the map having the reference distance from a location on the first street on the map coinciding with the first point on the trajectory.

8. The method of claim 1 further comprising:
choosing a map patch based on a GPS position of the vehicle; and
constraining to the map patch the determining on a map at least one reference location on the first street corresponding to the first street sign having the reference distance from the second street corresponding to the second street sign.

9. The method of claim 1 further comprising:
dividing the trajectory into a plurality of sub-trajectories comprising a first sub-trajectory having at least two detected street signs and a second sub-trajectory having less than two detected street signs;
applying an iterative closed point method for optimizing the vertical position, the horizontal position and the angle of the second sub-trajectory by taking the end of the first sub-trajectory as an initial starting point after it has been mapped to the map.

10. The method of claim 1, wherein acquiring a trajectory of a vehicle comprises applying odometry.

11. The method of claim 1, wherein searching for street signs comprises attempting to detect at least one of the shape of a street sign and the street name on a street sign.

12. A system comprising:
means for acquiring a trajectory of a vehicle and means for concurrently searching for street signs;
a memory configured to,
upon detection of a first street sign, save the detection time and a first point on the trajectory related to a first street corresponding to the first street sign; and
upon detection of a second street sign, save the detection time and a second point on the trajectory related to a second street corresponding to the second street sign;
one or more processors configured to
determine a reference distance between the first point on the trajectory related to the first street and the second point on the trajectory related to the second street;
determine on a map at least one reference location on the first street corresponding to the first street sign having the reference distance from the second street corresponding to the second street sign;
map the trajectory to the map such that the first point on the trajectory related to the first street coincides with the at least one reference location on the map;
optimize the position of the trajectory on the map according to an optimization criteria by shifting the first point on the trajectory along the first street on the map and concurrently rotating the trajectory on the map under the constraint that the second point on the trajectory corresponding to the second street coincides with another location of the second street on the map or another location on the map, the other location on the map having the reference distance from a location on the first street on the map coinciding with the first point on the trajectory.

13. The system of claim 12, wherein the means for acquiring the trajectory of a vehicle and the means for concurrently searching for street signs comprise means for odometry.

14. The system of claim 12, wherein the one or more processors are comprised in a computing device coupled to the means for odometry and the memory and wherein the computing device is comprised in a backend device or in a mobile device or comprised in the vehicle.

15. A non-transitory computer-readable storage medium comprising a program with computer-executable instructions which, when the program is executed-by a computer, cause the computer to carry out a method of global localization by
receiving a trajectory of a vehicle, the trajectory comprising a first point that corresponds to a first street detected street sign, the first point being associated with a detection time and the street name of a first street, the trajectory further comprising a second point that corresponds to a second detected street sign;
the second point being associated with a detection time and the street of a second street;
determining a reference distance between the first point on the trajectory related to the first street and the second point on the trajectory related to the second street;
determining on a map at least one reference location on the first street corresponding to the first street sign having the reference distance from the second street corresponding to the second street sign;
mapping the trajectory to the map such that the first point on the trajectory related to the first street coincides with the at least one reference location on the map;
optimizing the position of the trajectory on the map according to an optimization criteria by shifting the first point on the trajectory along the first street on the map and concurrently rotating the trajectory on the map under the constraint that the second point on the trajectory corresponding to the second street coincides with another location of the second street on the map or another location on the map, the other location on the map having the reference distance from a location on the first street on the map coinciding with the first point on the trajectory.

* * * * *